United States Patent [19]

Thomas et al.

[11] 4,410,391

[45] Oct. 18, 1983

[54] APPARATUS FOR RELINING AN UNDERGROUND GAS LINE OR THE LIKE WITHOUT EXCAVATION

[75] Inventors: William R. Thomas, Malvern; George S. Sykora, Strafford-Wayne, both of Pa.

[73] Assignees: UMAC, Inc., Paoli, Pa.; Brooklyn Union Gas Company, Brooklyn, N.Y.; a part interest

[21] Appl. No.: 449,047

[22] Filed: Dec. 13, 1982

Related U.S. Application Data

[62] Division of Ser. No. 227,336, Jan. 22, 1981, Pat. No. 4,394,202.

[51] Int. Cl.³ .............................................. B32B 35/00
[52] U.S. Cl. ..................... 156/574; 29/234; 29/235; 29/402.09; 138/97; 156/71; 156/83; 156/84; 156/94; 156/294; 156/391; 156/423; 156/499; 156/543; 264/36; 264/230
[58] Field of Search ................. 29/234, 235, 402.09; 138/89, 97; 156/83, 84, 71, 94, 250, 252, 287, 294, 391, 423, 499, 543, 574; 264/36, 230

[56] References Cited

U.S. PATENT DOCUMENTS 4,135,958  1/1979  Wood ............................. 156/287 X
4,233,101 11/1980  Scragg et al. .................. 156/294 X
4,295,494 10/1981  McGowan et al. ................. 138/89

Primary Examiner—Robert A. Dawson
Attorney, Agent, or Firm—Michael F. Petock

[57] ABSTRACT

A method and apparatus for repairing or relining an underground pipeline without having to excavate the pipe is enabled by attaching an expandable sealing unit to the end of a predetermined length of flexible tubing and feeding it through the pipeline. The flexible tubing is fed through the existing pipeline from a point beyond where the existing pipeline exits the earth, usually within the basement of a building. Once positioned in the desired location, the expandable sealing unit is expanded to form a tight seal at the desired location within the pipe by means of heating the expandable sealing unit by a heating unit connected to the source of energy through electrical conductors which pass through the flexible tubing.

22 Claims, 8 Drawing Figures

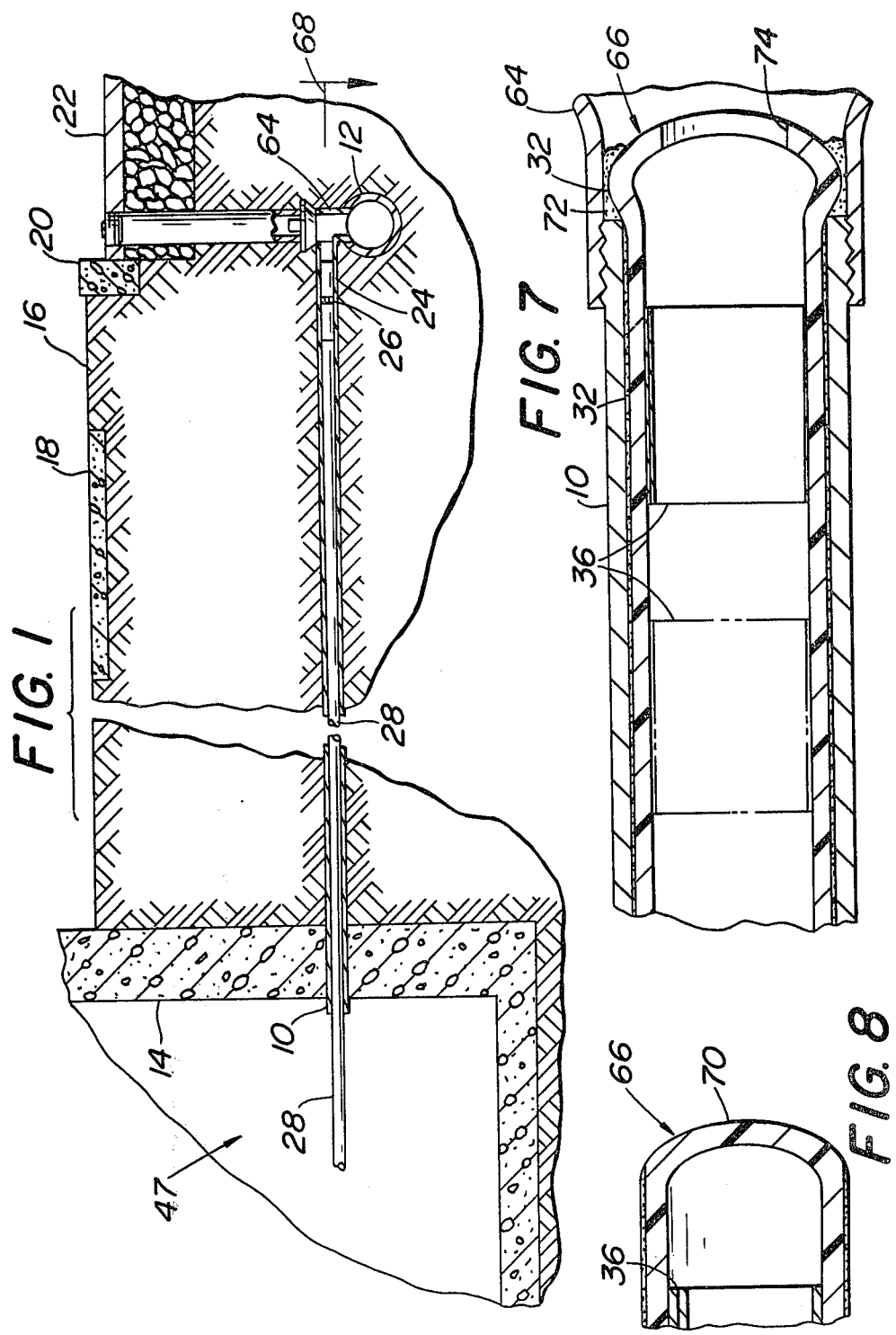

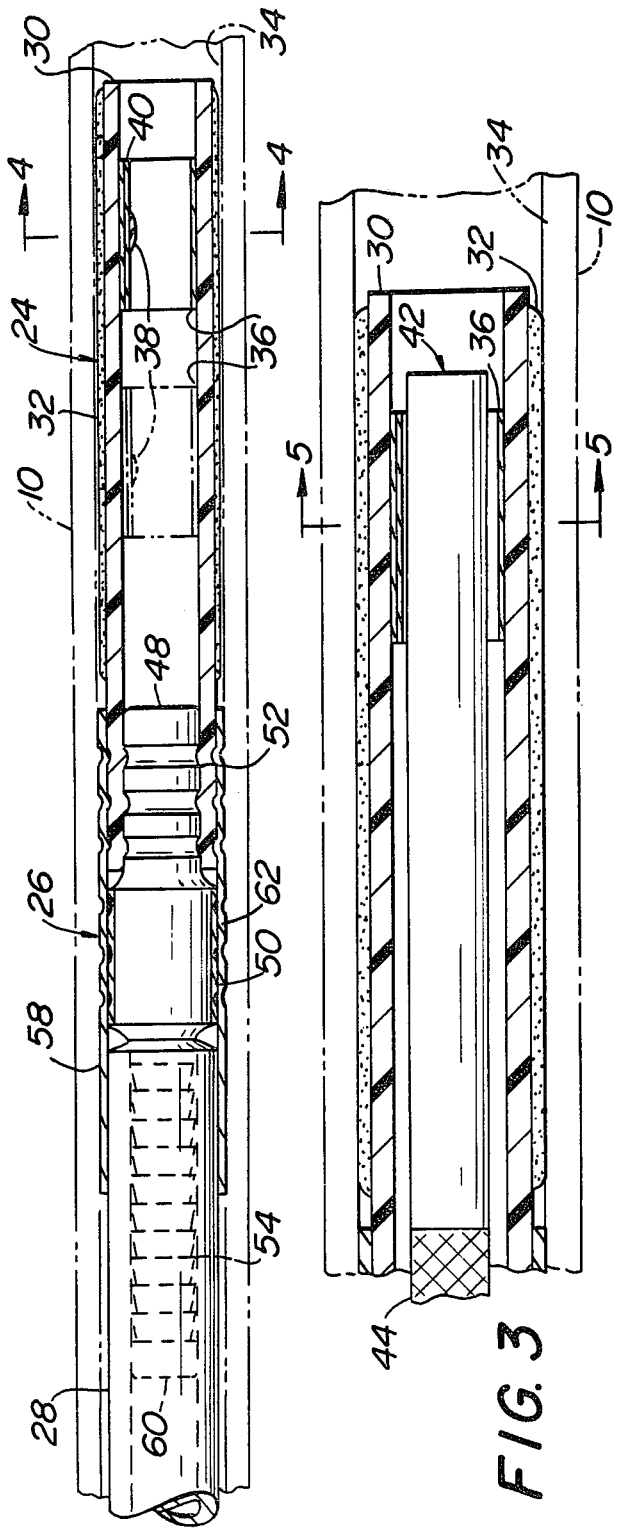

APPARATUS FOR RELINING AN UNDERGROUND GAS LINE OR THE LIKE WITHOUT EXCAVATION

This is a division of application Ser. No. 227,336, filed Jan. 22, 1981 by the inventors herein and entitled "Method And Apparatus For Relining An Underground Gas Line Or The Like Without Excavation", now U.S. Pat. No. 4,394,202.

BACKGROUND OF THE INVENTION

The present invention relates to a method and apparatus for relining an underground gas line or the like without requiring excavation. More particularly, the present invention relates to a method and apparatus in which a flexible tubing may be passed through an existing underground line with the ends thereof sealed to the interior of the pipeline at a point beyond the defect by means of a heat responsive expandable sealing unit.

The present invention is applicable to the repair of any inaccessible line. Very often, the line is inaccessible because it is an underground line. However, the present invention has been made particularly with respect to the repair of underground gas lines without the need of excavation, and more particularly, the repair of gas service lines or lines leading from the gas main to individual buildings, such as homes. Gas lines of this type are often installed and remain in existence for many years, very often for periods of time greatly in excess of twenty years. Very often, after a period of twenty or more years, such service lines may tend to deteriorate, especially due to the fact that they are underground and are not in an ideal environment. The repair of such service lines is normally an expensive operation. It is necessary to excavate to a gas service line, usually for the entire length of the building to the point where the gas line connects to the main. This usually requires excavation to or into the street, and usually through the sidewalk. There is usually substantial expense in this excavation and the necessary refilling and repaving operations.

Attempts in the past to repair underground lines have been made to mechanically install a rigid pipe within the existing pipeline in order to avoid excavation. However, the mechanical attachment has not been satisfactory, particularly as applied to gas lines. Furthermore, insertion of a metal pipe inside of an existing pipe required that the existing pipeline be perfectly straight. Examples of this type of prior art technology may be seen in U.S. Pat. Nos. 2,731,041; 2,756,779; 2,784,627 and 2,926,701. Attempts have also been made to seal leaking underground lines by forcing a sealing fluid under pressure into the line, with the sealing fluid infiltrating through the fault in the line and sealing the fault from further infiltration. This is shown by U.S. Pat. No. 3,710,812. Further, an attempt has been made to coat the interior of an underground line by a coating process to coat the interior of the pipeline after cleaning operations as shown in U.S. Pat. No. 3,211,573. These prior art attempts have proved to be ineffective in many cases such as curved line and deteriorating pipe, cumbersome in the number of steps required and expensive.

SUMMARY OF THE INVENTION

In accordance with the present invention, a method of and an apparatus for repairing or relining an underground pipeline is provided without the requirement of excavation. In accordance with the present method, a new flexible tubing is inserted into the pipeline and sealed to the inner surface of the pipeline at a point beyond the fault in the deteriorating existing pipeline.

In accordance with the method of the present invention, access is obtained to the pipeline at a point beyond where it exits the earth, which is usually inside of a building basement. An expandable sealing unit is mounted to one end of a predetermined length of flexible tubing by a connecting means. The predetermined length of flexible tubing is selected to be sufficient to extend through the pipeline to a point beyond all points of required pipeline repair. Once the expandable sealing unit is located at the desired location, preferably near the main, the expandable sealing unit is heated by means of a heating unit within the expandable sealing unit. The heating unit is connected to an external source of energy by means of electrical connectors which pass through the flexible tubing to the access point. Upon heating of the expandable sealing unit, the expandable sealing unit expands to form a tight seal between the outer surface of the expandable sealing unit and the interior surface of the pipeline. The heating unit is removed from the inside of the expandable sealing unit through the connecting means and the flexible tubing. The flexible tubing, which is mounted at its far end to the inside of the pipeline by means of the expanded sealing unit, may now be connected at its other end to a continuation of the gas line within the building. In this manner, a complete repair or relining of the gas line may be provided without excavation.

The expandable sealing unit comprises a tubular member of thermally stabilized cross-linked material mounted over at least one resilient sheet member. The resilient sheet member is coiled to provide a force tending to expand the diameter of the tubular member. A thermally stabilized cross-linked material is preshrunk after cross-linking to form a smaller diameter tubular plug wherein the material will expand to its cross-linked condition upon being heated within the pipe. A layer of bonding material, such as mastic, is provided over the cross-linked material, providing a bonding material between the cross-linked material and the inner surface of the pipeline.

The expandable sealing unit is connected to the end of a predetermined length of flexible tubing material by a connecting means. The connecting means is a tubular member adapted to receive the flexible tubing on one end and the expandable sealing unit on the other. The connecting means is provided with a ridged surface on each end for aiding in the bonding and retention of the flexible tubing and the expandable sealing unit. A thermally activated bonding material is also provided on each end of the connecting means. A heating element is inserted into one end of the connecting means in order to heat the same. After heating, the expandable sealing unit is slipped over the one end of the connecting means and, upon cooling, is bound thereto. The opposite end of the connecting means is then heated, and after removing the heating unit, the flexible tubing is then slid over and bonded to the other of the connecting means. The expandable sealing unit, the connecting means and the flexible tubing is then inserted as a unit into the pipeline to be repaired. This may be inserted into the existing pipeline with the heating unit already inserted within the expandable sealing unit. Once the expandable sealing unit is properly positioned, the heating unit may be energized to cause the expandable sealing unit to expand against the inner wall of the existing pipeline.

After the expandable sealing unit is expanded to form a tight seal to the pipeline at the distal end, the heating unit may be withdrawn back through the flexible tubing. Appropriate connections may then be made to the free end of the tubing and the repair and relining procedure is complete.

In another embodiment, the expandable sealing unit may be provided with a closed end thermally stabilized cross-linked material, which upon heating and subsequent cooling, expands and contracts to form a ball shaped element. The ball shaped element is desirable in insuring a tight seal at a junction, such as a right angle junction which is common at the "T" connection of the gas main. Once this seal is formed, a suitable drill or cutter may be inserted through the flexible tubing to drill or cut a hole through the end of the tube or ball-shaped element for gas or fluid flow.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a cross-sectional elevation view of a flexible relining tube mounted within an existing gas line or the like by means of an expandable sealing unit in accordance with the present invention.

FIG. 2 is a cross-sectional view taken through the expandable sealing unit and connector means with the flexible tubing attached thereto as inserted in a pipe in accordance with the present invention.

FIG. 3 is a cross-sectional view of another embodiment of the present invention with a heating element inserted within the expandable sealing unit in accordance with the present invention.

FIG. 4 is a cross sectional view taken along line 4—4 of the expandable sealing unit of FIG. 2 in accordance with the present invention.

FIG. 5 is a cross-sectional view taken along line 5—5 of FIG. 3.

FIG. 6 is an elevation view, partially broken away, showing the insertion of a heating element into one end of a connecting element with an expandable sealing unit already mounted on the other end in accordance with the present invention.

FIG. 7 is a cross-sectional view taken through the distal end of an expandable sealing unit of another embodiment of the present invention as mounted at a junction of the pipe to be repaired in accordance with the present invention.

FIG. 8 is a cross-sectional view taken through the distal end of an expandable sealing unit of the embodiment of FIG. 7 of the present invention prior to expansion.

DETAILED DESCRIPTION OF THE PREFERRED EMBODIMENTS

Referring now to the drawings in detail, wherein like numerals indicate like elements, there is shown in FIG. 1 a line 10 running between a main 12 and the interior of a building wall 14. The line 10 may be any type of a line which needs to be repaired without excavation. However, for the purposes of illustration, and without intending to be limiting, the invention herein will be described with respect to the repairing and relining of a gas line running from a gas main. It is understood that other types of lines may be repaired, such as water lines, in accordance with the present invention.

The line 10 and the main 12 are shown buried in earth 16 as is conventional. A typical sidewalk 18, curb 20 and pavement 22 are shown for illustration purposes.

By means of the present invention, a line 10 may be repaired or relined, extending from the interior building wall out to the main 12, without having to excavate pavement 22, curb 20 or any of the earth 16 extending between the building wall 14 and the main 12. Excavation and replacement of items such as pavement, curbs and sidewalks is extremely expensive. Even the excavation and refilling of unimproved earth is very expensive.

The present invention may be used with any type of suitable line 10, such as conventional steel, copper or synthetic pipes. Furthermore, the pipe 10 need not be perfectly straight and may be curved.

In accordance with the present invention, there is shown in FIG. 1 an expandable sealing unit 24, a connector unit 26 and a flexible tube or conduit 28 mounted in a line 10. The flexible tubing 28 is shown extending out of line or pipeline 10 into the interior basement beyond the cut or disconnected end of pipeline 10 projecting from the inside face of wall 14.

Referring now to FIG. 2, there is shown an assembled expandable sealing unit 24, a connector 26 and a flexible tube 28 inserted into pipeline 10 prior to the expansion of expandable sealing unit 24. In the embodiment illustrated in FIG. 2, expandable sealing unit 24 includes a tubular member of thermally stabilized cross-linked material 30. The thermally stabilized cross-linked material of tubular member 30 may preferably be cross-linked polyolefin, such as thermally stabilized cross-linked preshrunk polyethylene, although it is understood that other cross-linked polymers may be used, such as cross-linked polyvinyl chlorides, ABS (Acrylonitrile-butadiene-styrene copolymers), polyurethanes, most rubbers and/or polyolefins with a metal ion added such as that which is commercially available from E. I. duPont de Nemours & Co. under the trademark "SURLYN". Although the term cross-linked polyolefin or polyethylene may be used herein as specific examples of preferred embodiments, it is understood that other cross-linked materials and polymers may be used in practicing the present invention. The cross-linking of the polyolefin may be performed by ultra-violet light, chemical means such as the use of dicumal peroxide or by radiation. As is known in the art, cross-linked polyolefin or other thermally stabilized polymers tend to return to their size or condition at which they were cross-linked. In accordance with the present invention, cross-linked tubing, such as cross-linked polyolefin tubing, may be heated and stretched to reduce its radial dimension. The stretched cross-linked polymer may then be used to form tubular member 30 of expandable sealing unit 24 in accordance with the present invention. Upon reheating of expandable sealing unit 24, by means of a heater inserted therein, when the expandable sealing unit is positioned in the desired position in the line, tubular member of thermally stabilized cross-linked material 30 expands back to its normal cross-linked position, or in other words expands in diameter. This expansion causes an expansion of the expandable sealing unit in the line causing it to become firmly fixed in place.

Outside of tubular member 30 of expandable sealing unit 24, there is provided a relatively soft outer tacky surface layer 32 that will bond to the inner surface 34 of pipe 10. Layer 32 may be comprised of a mastic which is aggressive in its ability to stick to the inner surface 34 of pipeline 10. Layer 34 need not form a chemical or molecular bond with line 10, but a strong mechanical bond with the inner surface 34 of line 10 is sufficient when formed by an aggressive sticky mastic.

Mounted within tubular member 30 are one or more resilient members 36, which are preferably resilient sheet members, for aiding in expansion of tubular member 30 and for providing additional radially outward force against the inner surface of tubular member 30 to insure a tight seal by expandable sealing unit 24 to the inner surface 34 of pipeline 10. Resilient members 36 may have one or more turns or coils of resilient or spring material as shown at 40. Resilient members 36 are preferably retained in a contracted position by a meltable seal 38 such as a soldering bead, as may also be seen in FIG. 4, in conjunction with the other elements.

When it is desired to expand expandable sealing unit 24, a heating unit 42 is inserted into the center of tubular member 30 and resilient members 36. A heating unit 42 is illustrated in FIGS. 3 and 5. However, it is noted that FIG. 3 illustrates another embodiments of the invention where only a single resilient member 36 is utilized. Upon energization of heating unit 42, the meltable seal 38, such as a solder bead, is melted allowing the radially outward expansion force of spring or resilient members 36 to be applied against the inner surface of tubular member 30, and allowed to expand as tubular member 30 expands due to the heat of heating element 32. In this manner, a firm bond is formed between the mastic layer 32 and inner surface 34 of pipe 10. Heating unit 42 is provided with an electrical current through electrical conductors (not shown) contained within a cable 44, which may preferably be of the armored type. The heating unit and cable are inserted through the flexible tubing 28 and connector 26 with the heating element 42 extending into tubular member 30 and resilient member(s) 36, either before insertion of the assembly and flexible tubing 28 into pipe 10 or after the assembly and flexible tubing have been inserted into pipe 10. After energization of heating unit 42 and expansion of expandable sealing unit 24, cable 44 with its heating unit 42 is withdrawn into the basement area 47 of the building as shown in FIG. 1. The structure of FIG. 3 is further shown in cross-section in FIG. 5 wherein the central heating element of heating unit 42 is shown.

In use, the expandable sealing unit 24 is assembled to flexible replacement or relining tube 28 by a connector 26 before insertion into pipeline 10. Connector 26 is illustrated in FIGS. 2 and 6. Expandable sealing unit 24 is connected to end 48 of connector 26. Connector 26 is preferably comprised of a central metallic element having a longitudinal bore passing therethrough which includes a central portion 50, a ridged portion 52, which receives tubular member 30 of expandable sealing unit 24, and a ridged end 54 receiving flexible tubing 28. Ridged ends 52 and 54 are preferably covered with a heat sensitive mastic for insuring a firm air tight seal.

In use, a heating unit 56 is inserted into the center bore of end 48. For convenience, heating unit 56 may be a separate heating unit from that of heating unit 42 which is connected to a fairly long cable. Cable 44 must be of sufficient length to traverse the pipeline 10 from within basement area 47 to the desired point of attachment of expandable sealing unit within line 10. Once the end 48 is heated, the heating element 56 is withdrawn, and the appropriate end of tubular member 30 is slid over between cylindrical member 58 and end 48. The mastic on ridges 42 forms an air-tight seal. Cylindrical member 58 may preferably be a thin walled stainless tube which has been bonded to the central portion 50 of connector 26 by means of a hot melt adhesive 62 and roll crimping as shown by the ridged outer surface. The outer surface of cylindrical member 58 covering end 48 is also roll crimped.

The heating element 56 is then inserted into the bore of end 60 as shown in FIG. 6. Once end 60 is heated, heating element 56 is withdrawn and the flexible renewal or relining tubing 28 is slid over end 60 and is firmly bonded thereto by means of the heat sensitive mastic and the ridges 54 which are formed on end 60.

Referring to FIG. 7, there is shown another embodiment of the present invention which is most advantageously utilized in connection with the practice of the invention wherein the expandable sealing unit is positioned at a junction in the pipe such as the service "T" 64 shown in FIG. 1. FIG. 7 illustrates an expandable sealing unit 66 mounted with the end thereof extending just beyond the junction of the service "T" 64 and pipe 10. FIG. 7 is a cross-sectional view taken through the horizontal plane as illustrated at 68. Expandable sealing unit 66 is provided with one or more resilient members 36 which aid in expansion and the retaining of the expansion as described previously, FIG. 8 is a cross-section through the end of expandable sealing unit 66 prior to the application of heat and expansion. Upon the application of heat, the closed end tubular member of thermally stabilized cross-linked material 70 expands tending to form a somewhat spherical shape as shown in FIG. 7. This expansion into a somewhat spherical or expanded balloon shape is advantageous as it expands into the pipe junction area 72 insuring that the soft outer tacky surface layer or mastic layer 32 forms a tight seal taking advantage of the difference in diameter of the pipeline and the junction point. Once the expandable sealing unit, along with the assembled connector and the flexible relining tube is positioned and sealed to the pipeline 10, a drill or cutting device may be inserted through flexible tubing 28 to cut a hole 74 through the end of expandable sealing unit 66 to enable the passage of gas, water or other fluids through the pipeline 10.

In summary, the method of repairing or relining an underground pipeline in accordance with the present invention is to obtain access to pipeline 10 at a point beyond where it exits the earth, such as the inside of wall 14 within a basement area of a building. The existing pipeline is opened by disconnecting a union or cutting the line within wall 14. The expandable sealing unit 24 is mounted by means of connector 26 to a length of flexible tubing 28 sufficient to extend into pipeline 10 to a point beyond all points of required pipeline repair, and preferably to the service "T" 64 of the main 12. The expandable sealing unit may be of the type 24 or of the type 66. Type 66 enhances sealing to pipeline 10 at a junction in the pipeline, but requires the additional step of cutting through the end of the sealing unit.

Once the expandable sealing unit 24 or 66 is positioned at the desired location, the expandable sealing unit is heated by means of a heating unit 42. The heating unit 42 is connected to an external source of electrical energy by electrical conductors passing through cable 44 which passes through the flexible tubing 28 from a point beyond where the pipeline exits the earth. Upon being heated, the expandable sealing unit expands to form a tight seal between the outer surface of the expandable sealing unit and the interior surface of the pipeline. The expansion of the sealing unit may be enhanced by means of resilient members which provide a radially directed outward force when a meltable seal, such as a solder bead, is melted by the heating unit.

Once the heating unit cools, it is removed by withdrawing it from the internal portion of the expandable sealing unit through the connecting means and the flexible tubing. The repair and the relining procedure may be completed by connecting the flexible tubing which extends out of pipeline 10 to the continuation of the gas or other fluid line within the building.

The flexible tubing 28 may preferably be a polyethylene tubing, although any suitable type of flexible renewal tubing may be utilized.

The present invention may be embodied in other specific forms without departing from the spirit or essential attributes thereof and, accordingly, reference should be made to the appended claims, rather than to the foregoing specification as indicating the scope of the invention.

We claim:

1. An apparatus for repairing or relining an underground pipeline or the like without excavation to obtain access to the pipe, comprising:

an expandable sealing unit comprising a tubular member of thermally stabilized cross-linked material mounted over at least one resilient member, said resilient member having a force tending to expand the diameter of said tubular member, said thermally cross-linked material having been preshrunk after cross-linking to form a smaller diameter tubular member wherein said material will expand to its cross-linked condition upon being heated, and a layer of bonding material mounted over said cross-linked material providing a bonding material between the cross-linked material and the inner surface of the pipeline into which it is to be inserted;

a predetermined length of flexible tubing material; and a connecting means for connecting said expandable sealing unit to one end of said flexible tubing whereby said expandable sealing unit, connecting means and one end of said flexible tubing may be inserted into said pipeline from a point beyond where the pipeline exits from the earth to a point beyond where said pipeline needs repair, said expandable sealing unit being heatable by a heating unit insertable into said expandable sealing unit causing said cross-linked material and said resilient member to expand forming a bond utilizing said bonding material between said expandable sealing unit and the inner surface of the pipeline.

2. An apparatus in accordance with claim 1 wherein said expandable sealing unit is provided with a plurality of resilient sheet member units for providing an outward force on the inner surface of said cross-linked material.

3. An apparatus in accordance with claim 1 wherein said resilient member is provided with a heat meltable bond for maintaining said resilient member in a contracted condition until heated.

4. An apparatus in accordance with claim 1 wherein said end of said tubular member opposite to the end connected to said connecting means is closed, and wherein the expansion and contraction of said end form a semi-hemispherical type surface which forms a tight seal between said expandable sealing unit and the inner surface of said pipe, preferably at a junction in the pipeline, and wherein said end may then be cut through for the passage of the fluid or gas to be carried by the pipeline.

5. An apparatus in accordance with claim 1 wherein said connecting means is a double-ended connector which may be mounted to said expandable sealing unit and said flexible tubing by sequentially heating each side by the insertion of a heating element into the end of the connecting element.

6. An apparatus in accordance with claim 5 wherein said connecting means is provided with an outer cylindrical connecting member covering the outer surface of the preshrunk material of the expandable sealing unit and the outer surface of the flexible tubing.

7. An apparatus in accordance with claim 1 wherein said expandable sealing unit is provided with a soft outer tacky surface layer to enhance bonding between the expandable sealing unit and the inner surface of the pipeline to be repaired.

8. An apparatus in accordance with claim 7 wherein said soft outer tacky surface layer is a heat sensitive mastic.

9. An apparatus in accordance with claim 1 wherein said resilient member is a resilient sheet member.

10. An apparatus for repairing or relining a pipeline without obtaining access to the point or points of desired pipeline repair, comprising:

an expandable sealing unit comprising a tubular member of a heat responsive radially expandable material;

a predetermined length of flexible tubing material; and connecting means for connecting said expandable sealing unit to one end of said flexible tubing whereby said expandable sealing unit, connecting means and said one end of said flexible tubing may be inserted into said pipeline from an accessible point of said pipeline to a point beyond where said pipeline needs repair, said expandable sealing unit being heatable by a heating unit insertable into said expandable sealing unit to form a bond to the inner surface of the pipeline.

11. An apparatus for repairing or relining a pipeline in accordance with claim 10 wherein said expandable sealing unit includes a tubular member of thermally stabilized cross-linked material which has been preshrunk after cross-linking to form a smaller diameter tubular member wherein said material will expand to its cross-linked condition upon being heated.

12. An apparatus for repairing or relining a pipeline in accordance with claim 10 including a resilient member mounted within said tubular member and having a radially directed outward force tending to expand the diameter of said tubular member.

13. An apparatus for repairing or relining a pipeline in accordance with claim 10 including a layer of bonding material mounted over said tubular member providing a bonding material between the outer surface of the tubular member and the inner surface of the pipeline into which it is to be inserted.

14. An apparatus for repairing or relining a pipeline in accordance with claim 10 wherein said pipeline comprises an underground pipeline or the like which may be repaired without excavation.

15. An apparatus for repairing or relining a pipeline in accordance with claim 10 wherein said expandable sealing unit is provided with a plurality of resilient sheet member units mounted within said tubular member for providing an outward force on the inner surface of said tubular member.

16. An apparatus for repairing or relining a pipeline in accordance with claim 12 wherein said resilient member is provided with a heat meltable bond for maintaining said resilient member in a contracted condition until heated.

17. An apparatus for repairing or relining a pipeline in accordance with claim 10 wherein said end of said tubular member opposite the end connected to said connecting means is closed, and wherein the expansion and contraction of said end form a semi-hemispherical type surface which forms a tight seal between said expandable sealing unit and the inner surface of said pipeline, preferably at a joint in the pipeline, and wherein said end may be cut through for the passage of a fluid or gas to be carried by the pipeline.

18. An apparatus for repairing or relining a pipeline in accordance with claim 10 wherein said connecting means is a double-ended connector which may be mounted to said expandable sealing unit and said flexible tubing by sequentially heating each side by the insertion of a heating element into the end of the connecting means.

19. An apparatus in accordance with claim 18 wherein said connecting means is provided with an outer cylindrical connecting member covering the outer surface of the tubular member of the expandable sealing unit and the outer surface of the flexible tubing.

20. An apparatus for repairing or relining a pipeline in accordance with claim 10 wherein said expandable sealing unit is provided with a soft outer-tacky surface layer to enhance bonding between the expandable sealing unit and the inner surface of the pipeline to be repaired.

21. An apparatus for repairing or relining a pipeline in accordance with claim 20 wherein said soft outer-tacky surface layer is a heat sensitive mastic.

22. An apparatus for repairing or relining a pipeline in accordance with claim 12 wherein said resilient member is a resilient sheet member.

* * * * *